May 1, 1945.   H. H. BLAKE, JR   2,374,725
CHUCK
Filed Aug. 10, 1942

INVENTOR,
HAROLD H. BLAKE, JR.
BY
A. Schapp
ATTORNEY.

Patented May 1, 1945

2,374,725

UNITED STATES PATENT OFFICE 2,374,725

CHUCK

Harold H. Blake, Jr., Burlingame, Calif.

Application August 10, 1942, Serial No. 454,273

4 Claims. (Cl. 279—52)

The present invention relates to improvements in chucks, and has particular reference to chucks used in connection with a lathe or similar machinery for holding a tool or an object to be worked on.

In machines of this character, accuracy and trueness are the principal considerations, and in the present invention it is proposed to provide a chuck which holds the tool or work absolutely true in view of the fact that the tool-holding collet is directly secured into the headstock spindle of the machine and is held in true concentric position by means of long conical contact faces.

It is further proposed to provide means disposed in front of the spindle for imparting endwise movement to the collet, this means being arranged to allow the collet to be inserted and removed as an individual unit for affecting quick changes from one collet to another.

It is further proposed to provide a chuck of the character described which is relatively simple, comprises only a few parts, is inexpensive and may be easily exchanged for another chuck to suit different conditions.

It is further intended to provide a new form of collet adapted for cooperation with the other parts of the chuck in producing the desired results.

Further objects and advantages of my invention will appear as the specification proceeds, and the novel features of the same will be fully set forth in the claims hereto attached.

Figure 1:
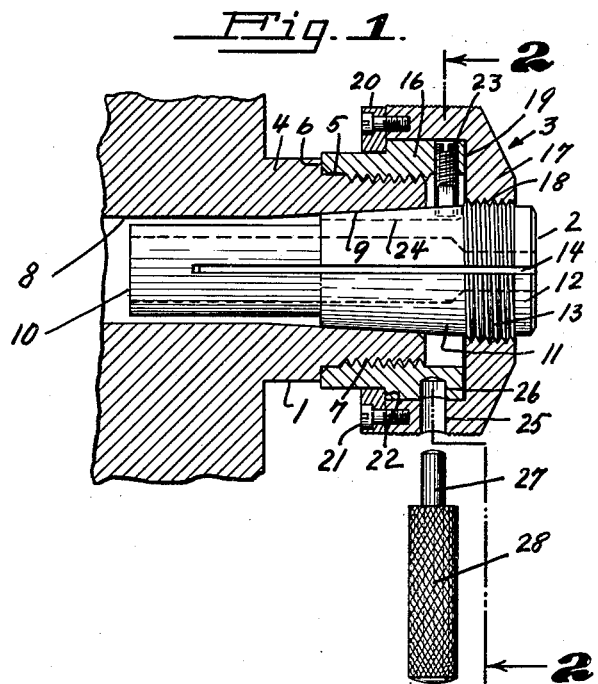

The preferred form of the invention is illustrated in the accompanying drawing, forming part of this application, in which:

Figure 1 shows a vertical axial section through my chuck; and

Figure 2:
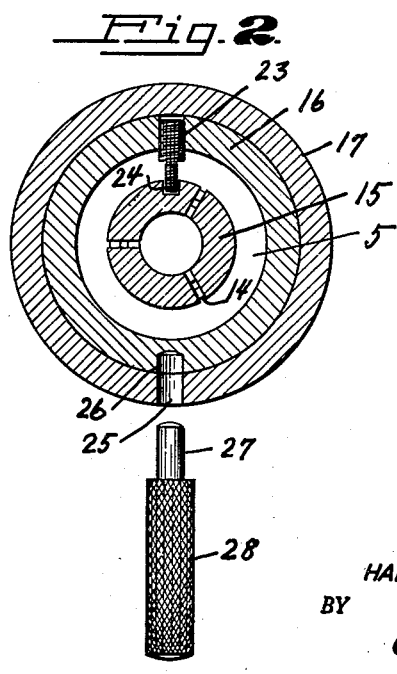

Figure 2, a transverse section, taken along line 2—2 of Figure 1.

While I have shown only the preferred form of my invention, I wish to have it understood that various changes or modifications may be made within the scope of the claims hereto attached, without departing from the spirit of the invention.

Referring to the drawing in detail, my chuck comprises in its principal features, a spindle 1, a collet 2 and means, indicated at 3, for positioning the collet with respect to the spindle.

The spindle includes a tubular extension 4 having a reduced end 5, so as to form a shoulder or stop 6, the end being threaded, as at 7. The spindle is formed with a cylindrical bore 8, terminating, in the extension, in a tapered bore 9.

The collet 2 comprises an inner cylindrical section 10, an intermediate tapered section 11 and an outer cylindrical section 12, which latter is threaded, as at 13. A plurality of slots 14 extend from the outer section longitudinally through the conical section into the inner section, so as to provide a plurality of jaws 15 adapted to be clamped upon an object when they are compressed by the tapered section of the collet being driven into the tapered bore of the spindle.

It should be noted that both the tapered bore of the spindle and the tapered section of the collet are of considerable length, and are capable of deep engagement over a wide surface area, so that when the collet is firmly positioned its center-line will run absolutely true with the center-line of the spindle.

For positioning the collet in the spindle, I provide a sleeve 16 adapted to be threaded upon the end of the spindle until it is firmly lodged against the shoulder 6, and a collar 17 revolvably mounted upon the sleeve and threaded upon the outer section of the collet, as at 18.

The collar is held against rearward motion on the sleeve by bearing upon the front end thereof, as at 19, and is held against forward motion by a ring 20 secured to the collar by means of screws 21 and bearing against a shoulder 22 formed in the sleeve.

The collet is held against turning movement by means of a pin 23 projecting from the sleeve inwardly into a longitudinal groove 24 formed in the tapered section of the collet. It will thus be seen that the collet may be moved back and forth by rotation of the collar 17.

While, normally, the collar 17 is revolvable on the sleeve, it may be desirable to tie the collar and the sleeve into one unit for common operation. For this purpose I provide a hole 25 in the collar and a depression 26 in the sleeve, the hole in the collar being adapted to be brought into registry with the depression 26 for receiving a pin 27 projecting from a handle 28.

When the handle is thus inserted, the sleeve and the collar may be turned as a unit for tightening and unscrewing the sleeve 16.

The manner of assembling the chuck is very simple:

The sleeve 16 and the collar 17 may be first assembled to form a unit, which thereupon may be threaded upon the spindle, with the pin 23 positioned as shown. After the handle 28 has been removed, the collar is free to turn on the sleeve, but is firmly held against endwise movement.

The collet 2 may now be inserted, making sure that the groove 24 registers with the pin 23. The collet is pushed inward until its thread reaches the thread in the collar 17, whereupon engagement of the threads may be initiated by a turning movement of the collar.

The jaws of the collet may be firmly clamped upon a tool or other desired object by further rotation of the collar 17. For removal of the collet, and for loosening its grip upon the tool, the collar 17 is turned in the opposite direction.

It will be readily seen that it is a simple process to substitute a different collet, or a different holding means, and that the entire operation of assembling the chuck has been much simplified and reduced to very few parts.

I claim:

1. In a chuck of the character described, a spindle having a tapered bore therein, a collet having a tapered section adapted to seat in the tapered bore and having a part projecting outside the spindle, a sleeve threaded on the extension, cooperable means on the sleeve and the collet for holding the latter against rotary movement, and a collar revolvable on the sleeve and threaded on the projecting part of the collet for imparting endwise movement to the latter when the collar is turned, the collar and the sleeve having holes adapted to be brought into registry by a turning movement of the collar for receiving a tool for common operation of the sleeve and the collar.

2. In a chuck for a lathe or the like, a spindle having a tapered bore and having a member removably fixed upon the outer end thereof, with an annular shoulder on said member, a collet having a tapered intermediate section adapted to seat in the bore and having a threaded section extending outside the bore, means for holding the collet against rotary movement, and a collar revolvable on the shoulder and having means for holding the same against endwise movement on the shoulder, the collar having a thread engageable with the collet thread for endwise moving the latter, whereby the collet may be inserted and removed as an individual unit, the said member and the collar having holes adapted to be brought into registry by a turning movement of the collar for receiving a tool for common operation of the said member and the collar.

3. In a chuck for a lathe or the like, a hollow spindle having a tapered bore and having a member removably fixed upon the outer end thereof, with an annular shoulder on said member, a collet having a tapered intermediate section adapted to seat in the bore and having a threaded section extending outside the bore, the collet being hollow from end to end to allow of introduction of stock from the rear thereof, co-operative means on the member and the collet for holding the latter against rotation, and a collar revolvable on the shoulder and having a thread engageable with the collet thread for endwise moving the latter, whereby the collet may be inserted and removed while the other parts remain in assembled relation.

4. In a chuck for a lathe or the like, a hollow spindle having a tapered bore and having a member removably fixed upon the outer end thereof, with an annular shoulder on said member, a collet having a tapered intermediate section adapted to seat in the bore and having a threaded section extending outside the bore, the collet being hollow from end to end to allow of introduction of stock from the rear thereof, means for holding the collet against rotation, and a collar revolvable on the shoulder and having a thread engageable with the collet thread for endwise moving the latter, whereby the collet may be inserted and removed while the other parts remain in assembled relation.

HAROLD H. BLAKE, Jr.